Patented Jan. 9, 1945

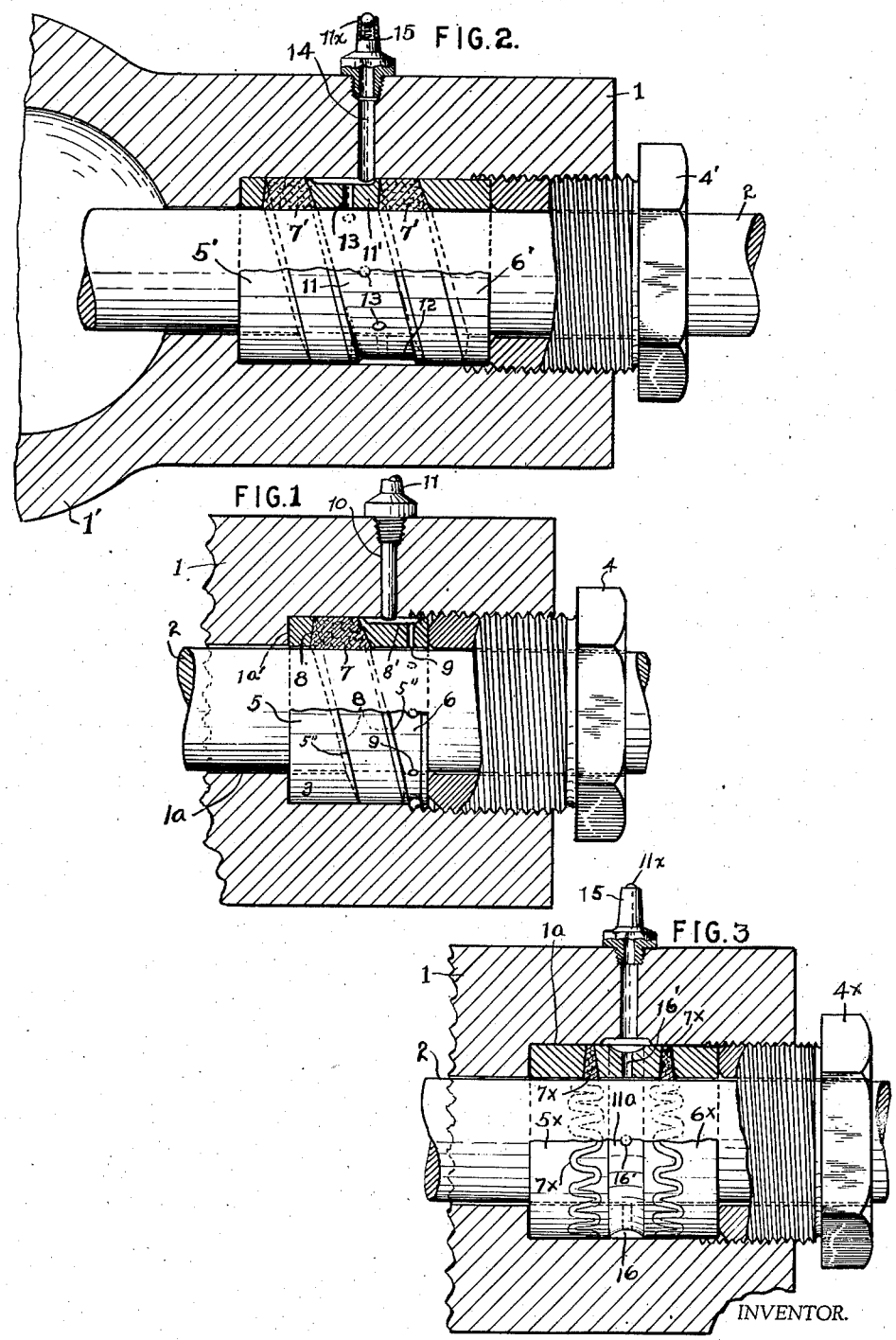

2,366,729

UNITED STATES PATENT OFFICE 2,366,729

PACKING

Edward Hanson, Cleveland, Ohio

Application December 27, 1940, Serial No. 371,885

3 Claims. (Cl. 286—8)

This invention relates to packing for a shaft to seal it with respect to the housing or other member through which the shaft extends, whereby liquid or a gas on one side of the packing cannot escape; more specifically the invention relates to packing for a shaft, having combined or incorporated therewith lubricating means, whereby the shaft may readily rotate and the packing insure sealing of the shaft opening. Where packings, of which I have knowledge, have heretofore been lubricated, no provision has been made to so apply the lubricant that it would flow or otherwise be supplied between the engaged surfaces of the shaft and packing, but the lubricant was merely injected into the packing and capillary attraction inherent in the packing material was relied upon to effect the desired lubrication. Such an arrangement has been found to be inadequate probably because the compression on the packing prevented the lubricant from seeping therethrough.

In the following disclosure, the invention is, by way of example, applied to or within a hollow boss, which is provided on the wall of a housing containing one or more operating devices, and seals the shaft which extends through the boss to operate the devices within the housing.

One object of the invention is to provide an improved shaft packing having portions so related to the surface of the shaft that the latter in rotating serves to convey the lubricant to the bearing surface of the packing material.

Another object of the invention is to provide an improved shaft packing having spaced portions disposed angularly and off-set longitudinally of the axis of the shaft for sealing engagement with the latter and a lubricant supply means, arranged to supply lubricant to the shaft whereby the latter in rotating serves to convey the lubricant to that surface of the packing material which engages the shaft.

Another object of the invention is to provide an improved shaft packing or gland wherein is incorporated a lubricant reservoir so related to portions of the packing that the shaft, when rotating, conveys the lubricant into contact with that surface of the packing, which engages the shaft.

Another object of the invention is to provide an improved combined packing and lubricating means therefor the parts of which are arranged to permit compression of the packing to insure sealing.

A further object of the invention is to provide an improved combined packing and lubricating means therefor of simple and economical construction.

Other objects of the invention will be apparent to those skilled in the art to which my invention relates from the following description taken in connection with the accompanying drawing, wherein Fig. 1 s a fragmentary section of a lubricated packing embodying my invention.

Figs. 2 and 3 are fragmentary sections illustrating modifications of the packing and embodying my invention.

In the drawing, referring particularly to Fig. 1, 1 indicates a hollow boss forming an integral part of a casing or housing 1' (see Fig. 2), which may contain gears, rotary pump elements or other operating parts to be driven by a shaft indicated at 2 and also a fluid in a gaseous or liquid state. 3 indicates as an entirety a packing seated in the enlarged portion of the bore or opening 1a through the boss 1 and serving to prevent leakage of the fluid contained in the housing 1' therefrom around the shaft 2. The boss 1, adjacent its open end, is threaded internally to take a hollow nut 4, whereby the packing 3 may be compressed between the inner end of the nut and the shoulder 1a' formed by the enlarged portion of the opening through the boss. The packing 3 consists of terminal members or annuli 5, 6, and an annular section of packing material 7 between them. The packing material may consist of any desirable deformable material or composition of materials, dependent upon the pressure and temperature existing in the casing 1' as well as the maximum heat that may be generated by the frictional engagement of the shaft with the packing material. The members 5, 6, loosely fit the bore 1a of the boss 1 and have an internal diameter slightly greater than that of the shaft 2 to prevent frictional engagement therewith and permit the lubricant to spread thereover. The outer ends of the members 5, 6, are disposed in planes at right angles to their axes so that the outer end of the member 5 may rest against the shoulder 1a' and the outer end of the member 6 may be engaged by the inner end of the nut 4. The opposed faces 5'' of the members 5, 6, are disposed at an angle oblique to the axis of the shaft 2, but substantially parallel to each other. The internal diameter of the section of packing material 7 is such that when the nut 4 is tightened or screwed inwardly, the packing material is compressed radially inwardly to engage the shaft. It will be noted that when the members 5, 6, and section of packing material 7 are assembled, and the nut 4 is screwed inwardly the packing material will be inclined obliquely and take the shape of the faces 5''; however, the section of material 7 may be pre-shaped to fit the opposed end faces of the members 5, 6. By preference, the inner end face 5'' of each member 5, 6, may be beveled so as to extend inwardly, as shown at 8. In this form of construction the beveled walls tend to force the packing material 7 inwardly into sealing relation to the shaft, due to the screwing in of the nut 4.

One of the members 5, 6, for example, the member 6, is externally recessed circumferentially, as shown at 8, to form a holder for a supply of suitable lubricant, and also formed with one or more radially disposed ducts 9, which lead from the bottom of the holder or reservoir 8' through the wall of the member, so that the lubricant in the holder may flow into engagement with the shaft 2 and spread over the adjacent surface of the latter within the member 6.

In the arrangement above described it will be noted that one side portion of the member 6 is diametrically related to a side portion of the packing material 7 in a plane at right angles to the axis of the shaft 2; that is, spaced portions of the packing 7 are off-set relative to each other longitudinally of the shaft so that one portion of the annulus 6 has an overlapping relation to a portion of the packing. Accordingly, by applying lubricant through this overlapping portion of the annulus 6 to the surface of the shaft 2, the latter as it rotates conveys the lubricant to the diametrically related portion of the packing material and hence lubricates the engaging surfaces between the packing and shaft; and as more lubricant is supplied to the shaft the continued rotation of the latter will cause the lubricant to flow or spread over the shaft to lubricate the entire inner surface of the packing material. The lubricant is supplied to the holder 8' through a passage or conduit 10 formed in the boss 1, the outer end of the conduit being threaded to receive a removable closure 11. The closure 11 is preferably constructed to provide a check valve 11x (see Fig. 2).

Fig. 2 illustrates a modified form wherein provision is made for supplying lubricant to two sections of packing material. In this form of construction I provide terminating members 5', 6', an annular section of packing material 7' in engagement with the inner end of each member 5', 6', and an annulus 11' between the sections of packing material 7', the nut 4' when screwed in serving to exert pressure on these parts endwise of the shaft 2 so as to force the sections of packing material 7' into sealing contact with the shaft 2. The members 5', 6', and annulus 11' loosely fit the bore 1 but their internal diameter is slightly larger than that of the shaft 2 to prevent contact therewith, and provide space for the lubricant between these parts and the shaft. The inner ends of the members 5', 6', are disposed at an oblique angle to the axis of the shaft 2, as already set forth in connection with the members 5, 6, and the opposite end walls of the annulus 11' are shaped to correspond to the oblique angle of the inner ends of the members 5', 6', so that its opposite ends will co-act with the inner ends of the members 5', 6', to position the sections of packing material 7' at the same angle. The end walls of the members 5', 6', and annulus 11' which engage the sections 7' are beveled similarly to the end walls of the members 5, 6, as shown in Fig. 1 for like reasons. In this arrangement, while one side portion of each member 5', 6', is diametrically related a side portion of the adjacent packing section 7', the annulus 11' has a side portion diametrically related to one side portion of each packing section 7', so that while the annulus serves as a spacer between the sections 7', it serves as a lubricant supply means therefor. As shown, the outer wall of the annulus 11' is formed with a circumferential recess 12 to receive and hold a supply of lubricant and at spaced points it is formed with radially extending ducts 13 through which the lubricant flows from the holder or reservoir 12 to the surface of the shaft 2. Due to the relation of the opposite side portions of the annulus 11' to respective side portions of the sections 7', the lubricant will be supplied to portions of the shaft's surface which, due to the rotation of the shaft, will engage side portions of the respective sections 7' to effect lubrication thereof. Continued rotation of the shaft 2 and supply of the lubricant will serve to spread or effect flow of the lubricant over the entire inner surfaces of the sections 7'. The lubricant is supplied to the holder 12 by a conduit 14 extending through the side wall of the boss 1, its outer end being provided with screw threads to receive a removable closure 15, which is preferably provided with a check valve 11x.

Fig. 3 shows a modified form of packing mounted in the bore 1a of a boss 1, consisting of terminal members 5x, 6x, an annulus 11a and a section of suitable packing material 7x between the annulus and each of the members 5x, 6x. In this arrangement, a hollow nut 4x when screwed into the outer end of the bore 1a serves to force these parts together and hence effect engagement of the packing material with the shaft 2. In this form of construction the opposite faces of the annulus 11a are of zigzag or substantially serpentine shape and the inner faces of the members 5x, 6x, are of complementary shape so that when these parts and the sections of packing material are assembled and forced into final position, the sections of packing material assume the shape of the related faces between these parts; although, if desired, the packing material may be pre-shaped to fit these zigzag shaped faces. The annulus 11a is formed in its external wall with a circumferential recess 16 to form a reservoir for the lubricant and also formed with a plurality of ducts 16' disposed radially and leading from the reservoir through the annulus to supply lubricant to the shaft 2, which, due to its rotation, will cause the lubricant to spread or flow laterally over its surface. It follows from the shape of the end walls of the annulus 11a that portions of the shaft overlap portions of the packing material in engagement therewith, so that the lubricant which flows or spreads over the shaft will be conveyed into contact with the packing material to lubricate its inner surface.

While my invention is shown applied to a shaft within a boss and the packing material is subjected to pressure to prevent the escape of a liquid or a gas from a housing, it is equally adapted for employment where such pressure is not required, that is, in a tubular member or other arrangement where, if the escape of the liquid or gas was not prevented, parts outside the packing would be affected or ruined.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. In a packing, the combination with a housing have a boss and a shaft extending through the boss, of a packing mounted in said boss in surrounding relation to said shaft, said packing comprising a plurality of substantially rigid annular members, spaced members of said packing having opposed parallelly related end walls disposed in planes extending at an oblique angle to the shaft, and deformable packing material interposed between said spaced members, means for supplying lubricant to said shaft, and means for applying axial pressure to said members for forcing said packing material into sealing engagement with the walls of the boss and said shaft, whereby the arrangement of the packing material in conjunction with the rotation of the shaft provides a wiping action for distributing the lubricant over the surfaces of the latter.

2. A packing as claimed in claim 1, wherein said lubricant supply means consists of a recess formed in the outer wall of one of said substantially rigid members, a duct leading from said recess through the wall of said member and a supply duct formed in the wall of said boss and leading to said recess.

3. In a packing, the combination with a housing having a boss and a shaft extending through the boss, of a packing mounted in the boss in surrounding relation to said shaft, said packing comprising substantially rigid spaced members, an intermediate substantially rigid member, the opposed end walls of said spaced and intermediate members being disposed in planes extending at an oblique angle to said shaft and deformable packing material interposed between said intermediate member and each spaced member, means for supplying a lubricant through said intermediate member to said shaft, and means for applying axial pressure to said members for forcing said packing materials into sealing engagement with the walls of said boss and said shaft, whereby the arrangement of the packing materials in conjunction with the rotation of said shaft provides a wiping action for distributing the lubricant over the surfaces of the latter.

EDWARD HANSON.